(12) United States Patent
Miura et al.

(10) Patent No.: US 11,990,041 B2
(45) Date of Patent: May 21, 2024

(54) MOVING BODY TRACKING SYSTEM, MOVING BODY TRACKING METHOD, AND PROGRAM

(71) Applicant: NEC Corporation, Tokyo (JP)

(72) Inventors: Atsushi Miura, Tokyo (JP); Tomoaki Tanaka, Tokyo (JP); Shinya Yamamoto, Tokyo (JP); Jiro Kawamata, Tokyo (JP); Masaru Yokoyama, Tokyo (JP)

(73) Assignee: NEC CORPORATION, Tokyo (JP)

( * ) Notice: Subject to any disclaimer, the term of this patent is extended or adjusted under 35 U.S.C. 154(b) by 519 days.

(21) Appl. No.: 17/273,003

(22) PCT Filed: Sep. 4, 2019

(86) PCT No.: PCT/JP2019/034824
§ 371 (c)(1),
(2) Date: Mar. 3, 2021

(87) PCT Pub. No.: WO2020/050328
PCT Pub. Date: Mar. 12, 2020

(65) Prior Publication Data
US 2021/0256848 A1     Aug. 19, 2021

(30) Foreign Application Priority Data

Sep. 5, 2018 (JP) ................. 2018-165566

(51) Int. Cl.
*G08G 1/13* (2006.01)
*G06T 7/292* (2017.01)
(Continued)

(52) U.S. Cl.
CPC ............... *G08G 1/13* (2013.01); *G06T 7/292* (2017.01); *G08G 1/0125* (2013.01); *G08G 1/04* (2013.01); *G06T 2207/30236* (2013.01)

(58) Field of Classification Search
CPC ...................... G06T 7/292; G06T 2207/30236
See application file for complete search history.

(56) References Cited

U.S. PATENT DOCUMENTS

| 2012/0033123 A1 | 2/2012 | Inoue et al. |
| 2017/0220894 A1 | 8/2017 | Kuzuya et al. |

(Continued)

FOREIGN PATENT DOCUMENTS

| JP | H08-147591 A | 6/1996 |
| JP | 2000-353290 A | 12/2000 |

(Continued)

OTHER PUBLICATIONS

Machine Translation of Kuroki's reference (JP-2015-060443-A) (Year: 2015).*

(Continued)

*Primary Examiner* — Tarek Elarabi
(74) *Attorney, Agent, or Firm* — Sughrue Mion, PLLC

(57) ABSTRACT

A moving body tracking system, comprising: a first camera that captures image(s) of moving body entering an intersection, a plurality of second cameras installed in a plurality of locations set as destinations of the moving body entering the intersection, a moving direction determining part that determines a moving direction of the moving body entering the intersection due to a change in direction of the moving body based on captured data by the first camera, and a path specifying part that selects the second camera based on the moving direction of the moving body, searches a frame in which the specified moving body was captured from captured data by the second camera, and specifies a path of the moving body.

12 Claims, 12 Drawing Sheets

(51) Int. Cl.
  *G08G 1/01*     (2006.01)
  *G08G 1/04*     (2006.01)

(56) References Cited

U.S. PATENT DOCUMENTS

| | | | | |
|---|---|---|---|---|
| 2019/0120650 | A1* | 4/2019 | Miyake | ............ H04N 7/18 |
| 2019/0122052 | A1* | 4/2019 | Miyake | ............ G06V 20/52 |
| 2019/0139231 | A1 | 5/2019 | Aizawa | |
| 2020/0126407 | A1* | 4/2020 | Sakito | ............ G06V 20/52 |
| 2020/0380699 | A1* | 12/2020 | Amo | ............ G05D 1/02 |

FOREIGN PATENT DOCUMENTS

| | | | |
|---|---|---|---|
| JP | 2005-004426 | A | 1/2005 |
| JP | 2005-215909 | A | 8/2005 |
| JP | 2005-353004 | A | 12/2005 |
| JP | 2005353004 | A * | 12/2005 |
| JP | 2009-259158 | A | 11/2009 |
| JP | 2012-038089 | A | 2/2012 |
| JP | 2015-060443 | A | 3/2015 |
| JP | 2015060443 | A * | 3/2015 |
| JP | 2017-010225 | A | 1/2017 |
| JP | 2017010225 | A * | 1/2017 |
| JP | 2018-018393 | A | 2/2018 |
| WO | 2016/021411 | A1 | 2/2016 |

OTHER PUBLICATIONS

Machine Translation of Iida's reference (JP-2017-010225-A) (Year: 2017).*
Machine Translation of Kawasaki's reference (JP-2005-353004-A) (Year: 2005).*
Japanese Office Action for JP Application No. 2020-541275 dated Sep. 20, 2022 with English Translation.
International Search Report for PCT Application No. PCT/JP2019/034824, dated Dec. 3, 2019.

* cited by examiner

FIG. 5

| OBJECT ID | FRAME NUMBER | BOX CO-ORDINATE1 | BOX CO-ORDINATE2 | OBJECT TYPE | TIMESTAMP OF CAPTURED | CAMERA LOCATION INFORMATION |
|---|---|---|---|---|---|---|
| 42 | 001234 | x1,y1 | x2,y2 | Car | 2018/8/21 09:00:00 | 36° 00' 00" N 139° 50' 00" E |
| ... | ... | ... | ... | ... | ... | ... |

FIG. 7

| OBJECT ID | LOCATION | TIMESTAMP OF PASSING | LOCATION | TIMESTAMP OF PASSING | LOCATION | TIMESTAMP OF PASSING | ... |
|---|---|---|---|---|---|---|---|
| 42 | Location A (Camera a) | 2018/8/23 09:34:20 | Location B (Camera b) | 2018/8/23 09:34:30 | Location C (Camera c) | 2018/8/23 09:34:40 | ... |
| ... | ... | ... | ... | ... | ... | ... | ... |

MOVING BODY TRACKING SYSTEM, MOVING BODY TRACKING METHOD, AND PROGRAM

This application is a National Stage Entry of PCT/JP2019/034824 filed on Sep. 4, 2019, which claims priority from Japanese Patent Application 2018-165566 filed on Sep. 5, 2018, the contents of all of which are incorporated herein by reference, in their entirety.

FIELD

Description of Related Applications

This application is based upon and claims the benefit of the priority of Japanese patent application No. 2018-165566 filed on Sep. 5, 2018, the disclosure of which is incorporated herein in its entirely by reference thereto.

The present invention relates to a moving body tracking system, a moving body tracking method, and a program.

BACKGROUND

Origin-Destination (OD) surveys have been conducted as basic data for formulating road improvement plan and urban development plan. For example, the Ministry of Land, Infrastructure, Transport and Tourism (MLIT) conducts a nationwide OD survey every five years.

Patent Literature 1 discloses an automatic traffic volume measurement apparatus and an automatic traffic volume measurement system that can automatically measure moving object and consolidate the measurement results. According to the literature, this automatic traffic volume measurement apparatus comprises a moving object detection means, which compares a still image of a frame of video captured by a video camera with a reference image that serves as a comparison basis, and detects the presence of the moving object in the still image according to the comparison results. This automatic traffic volume measuring apparatus further comprises a type identifying means, which identifies the type of the moving object based on the pixels area of the image detected as the moving object by the moving object detecting means. This automatic traffic volume measurement apparatus further comprises a speed calculating means, which calculates the moving speed of the moving object based on the number of consecutive pluralities of the still images in which the presence of the moving object has been detected by the moving object detecting means. This automatic traffic measurement apparatus further comprises a data generating means to generate descriptive data that describes the images captured by the video camera in association with at least the type of the moving object, its moving speed, and the time at which it was detected.

Patent Literature 2 discloses a traffic information management apparatus that is capable of accurately and efficiently tracking a particular vehicle traveling on a road. According to this document, the traffic information management apparatus comprises traffic information collection apparatuses $200a$ to $f$, which are formed of cameras and other apparatuses installed at multiple points P1 to P6 on the road. By way of respective traffic information collection devices detecting the size, color, and other features of vehicles, the travel time(s) T1 to T5 between respective apparatuses is estimated. Based on the estimated travel time(s), the arrival time(s) of the particular vehicle at respective points are predicted, and the particular vehicle is detected at the predicted time(s). This improves the detection accuracy of the specific vehicle.

Patent Literature 3 discloses a traffic flow measurement apparatus that is capable of not decreasing recognition accuracy even if some or all of the vehicles are not detected. According to the same document, this traffic flow measurement apparatus comprises a location correction means 24 that extracts vehicle candidates from the image data at time t and corrects the position of the vehicle candidates whose mapping to time (t−1) has been completed using a predicted position. This traffic flow measurement apparatus also comprises a vehicle candidate correction means 25 that adds vehicle(s) that failed to be extracted to the vehicle candidates by giving their predicted position(s). This traffic flow measurement apparatus also comprises a passing judgment means 26 that determines vehicle candidate(s) that does not exist in a predetermined area as passing vehicle(s), and calculates traffic information by taking into account the location correction or addition of vehicle candidate(s) and passing vehicle(s).

[Patent Literature 1] Japanese Patent Kokai Publication No. JP2005-4426A

[Patent Literature 2] Japanese Patent Kokai Publication No. JP2000-353290A

[Patent Literature 3] Japanese Patent Kokai Publication No. JPH08-147591A

SUMMARY

The following analysis is given by the present invention. The OD survey as mentioned above has problems of being costly and time-consuming because it also uses questionnaires in combination. On the other hand, various devices have been proposed to identify moving bodies, such as people and vehicles, from images captured by cameras and other devices, and the accuracy of these devices has been improved (see Patent Literatures 1-3). However, the automatic traffic measurement device of Patent Literature 1 has the problem that it can only obtain descriptive data (description data) at the location where the video camera is installed. This is also the case with Patent Literature 3, which aims at measuring traffic flow using a camera that takes pictures of the road in the moving direction of a vehicle on the road.

The configuration of Patent Literature 2 does not bear in mind tracking of vehicles turning right or left, and to do so would require the installation of a large number of cameras along the presumed moving direction of the vehicles, which would be costly.

It is an object of the present invention to provide a moving body tracking system, a moving body tracking method and a program, which enable to contribute to reducing the cost and survey time required for tracking moving bodies such as vehicles entering an intersection.

According to a first aspect of the invention, there is provided a moving body tracking system, comprising: a first camera that captures image(s) of moving body entering an intersection, a plurality of second cameras installed in a plurality of locations set as destinations of the moving body entering the intersection, a moving direction determining part that determines a moving direction of the moving body entering the intersection due to a change in direction of the moving body based on captured data by the first camera, and a path specifying part that selects the second camera based on the moving direction of the moving body, searches a frame in which the specified moving body was captured from captured data by the second camera, and specifies a path of the moving body.

According to a second aspect of the invention, there is provided a moving body tracking method, comprising: determining a moving direction of a moving body entering an intersection based on a captured data by a first camera capturing the moving body entering the intersection, and selecting a second camera from a plurality of cameras installed in a plurality of locations determined as destinations of the moving body entering the intersection based on the moving direction of the moving body, and specifying a moving path of the moving body by searching frame(s) in which the moving body is captured from the captured data of the second cameras.

According to a third aspect of the invention, there is provided a program for causing a computer that is capable of accessing captured data captured respectively, by a first camera that captures an image(s) of a moving body entering an intersection, and a plurality of second cameras installed in a plurality of locations determined as destinations of the moving body entering the intersection, to perform: a process that determines a path direction of the moving body entering the intersection based on the captured data by the first camera, and a process that selects the second camera based on a path direction of the moving body, and specifies a path of the moving body by searching a frame(s) in which the moving body is captured from the captured data of the second camera. It is to be noted that this program can be recorded on a computer-readable (non-transient) storage medium. That is, the present invention can be implemented as a computer program product.

According to the present invention, it is possible to provide a moving body tracking system, a moving body tracking method, and a program, which contribute to reducing the cost and time required to track and investigate moving bodies such as vehicles entering an intersection. That is, the present invention transforms the configuration for tracking and surveying moving bodies described in the background technology into a configuration that is significantly improved in terms of its cost and survey time.

BRIEF DESCRIPTION OF THE DRAWINGS

FIG. 5 is a diagram showing an example of information stored in tagged and captured data storage part of a moving body tracking system according to a first example embodiment of the present invention.

FIG. 7 is a diagram showing an example of information stored in moving body path tracking data storage part of an example embodiment of the present invention.

PREFERRED MODES

Figure 1:
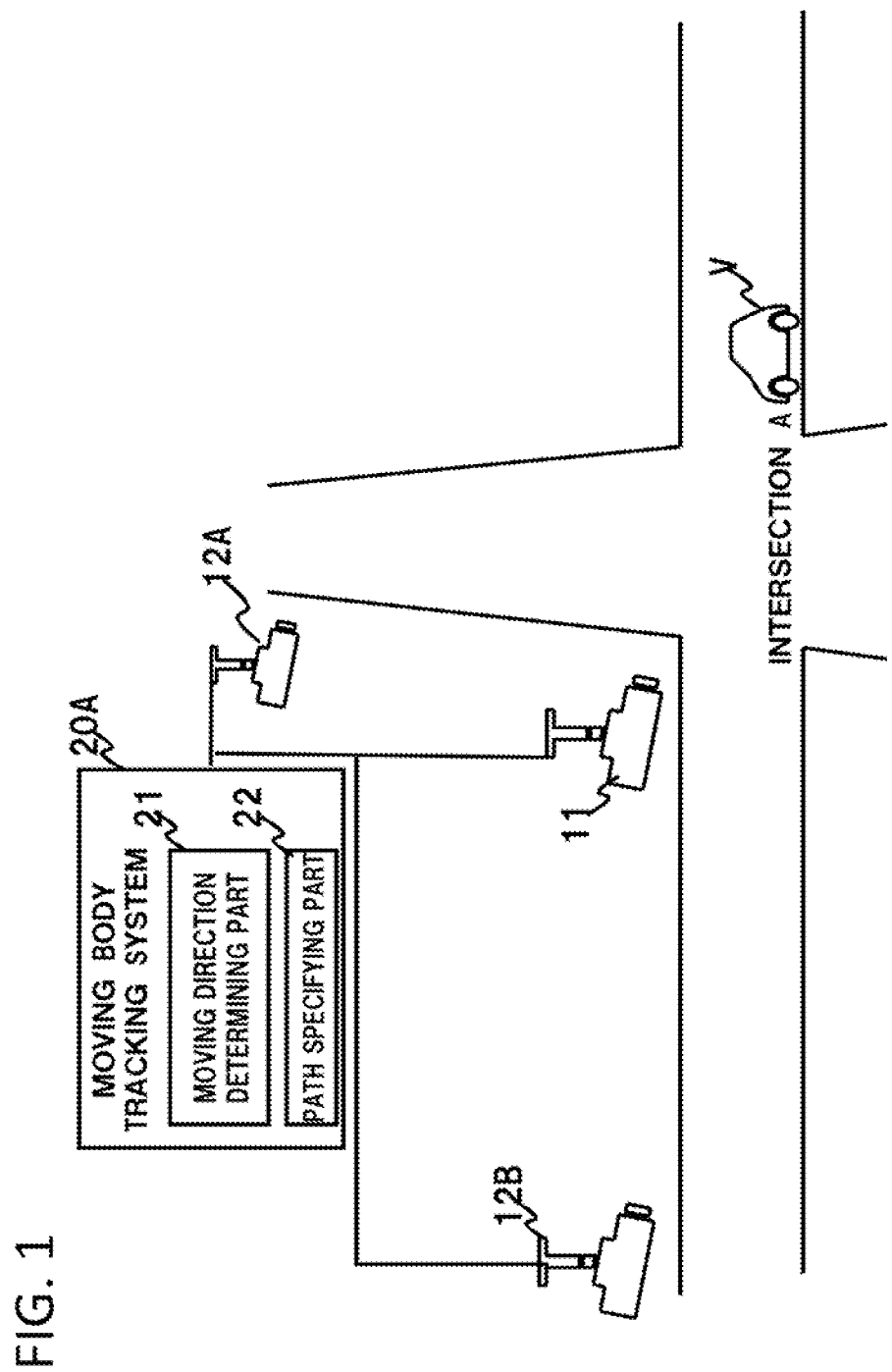
FIG. 1 is a diagram showing a configuration of an example embodiment of the present invention.

First, an outline of one mode of this invention will be described with reference to the drawings. Reference numbers referring to the drawings mentioned in this outline are for convenience as an example for facilitating understanding, and not intended to limit the present invention to the illustrated modes. And respective connection line(s) between blocks in the reference drawing appearing in the following description includes both bi-directional and single-directional. A single-directional arrow describes a main data flow schematically, which, however, does not exclude bidirectionality. In the following description, "A and/or B" is used in the sense of A and B, or A or B. The program is executed via a computer apparatus, and the computer apparatus is equipped with, for example, a processor, a storage device, an input device, a communication interface, and a display device if necessary. The computer apparatus is also configured to be able to communicate with devices (including computers) inside or outside the device via the communication interface, irrespective of wired or wireless. In the following description, "A and/or B" is used in the sense of at least one of A and B.

In one example embodiment thereof, the present invention can be realized by a moving body tracking system 20A that includes a first camera 11, a plurality of second cameras 12A, 12B, a moving direction determining part 21, and a path specifying part 22, as shown in FIG. 1. More concretely, the first camera 11 captures an image(s) of a moving body entering an intersection (e.g., intersection A in FIG. 1). The second cameras 12A and 12B are installed in a plurality of locations as destinations for the moving body entering the intersection and capture an image(s) of the moving body passing through the intersection.

Figure 2:
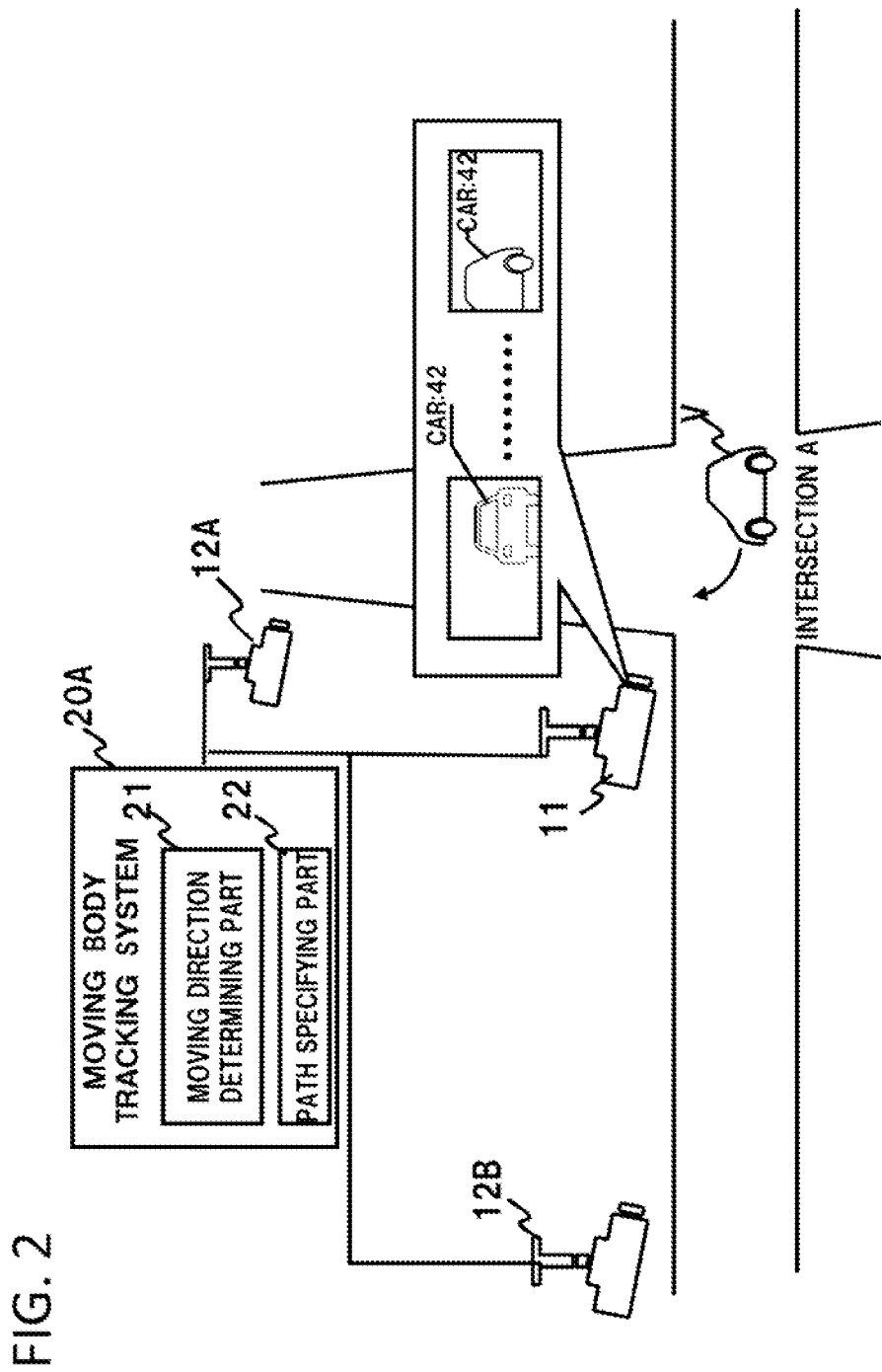
FIG. 2 is a diagram showing a description of an operation of an example embodiment of the present invention.

Based on the captured data of the first camera 11, the moving direction determining part 21 determines the moving direction of the moving body due to a change in direction of the moving vehicle entering the intersection. For example, as shown in FIG. 2, when a vehicle V enters an intersection A and turns right, the moving direction detecting part 21 determines that the vehicle V has turned right based on the captured data of the first camera 11.

Figure 3:
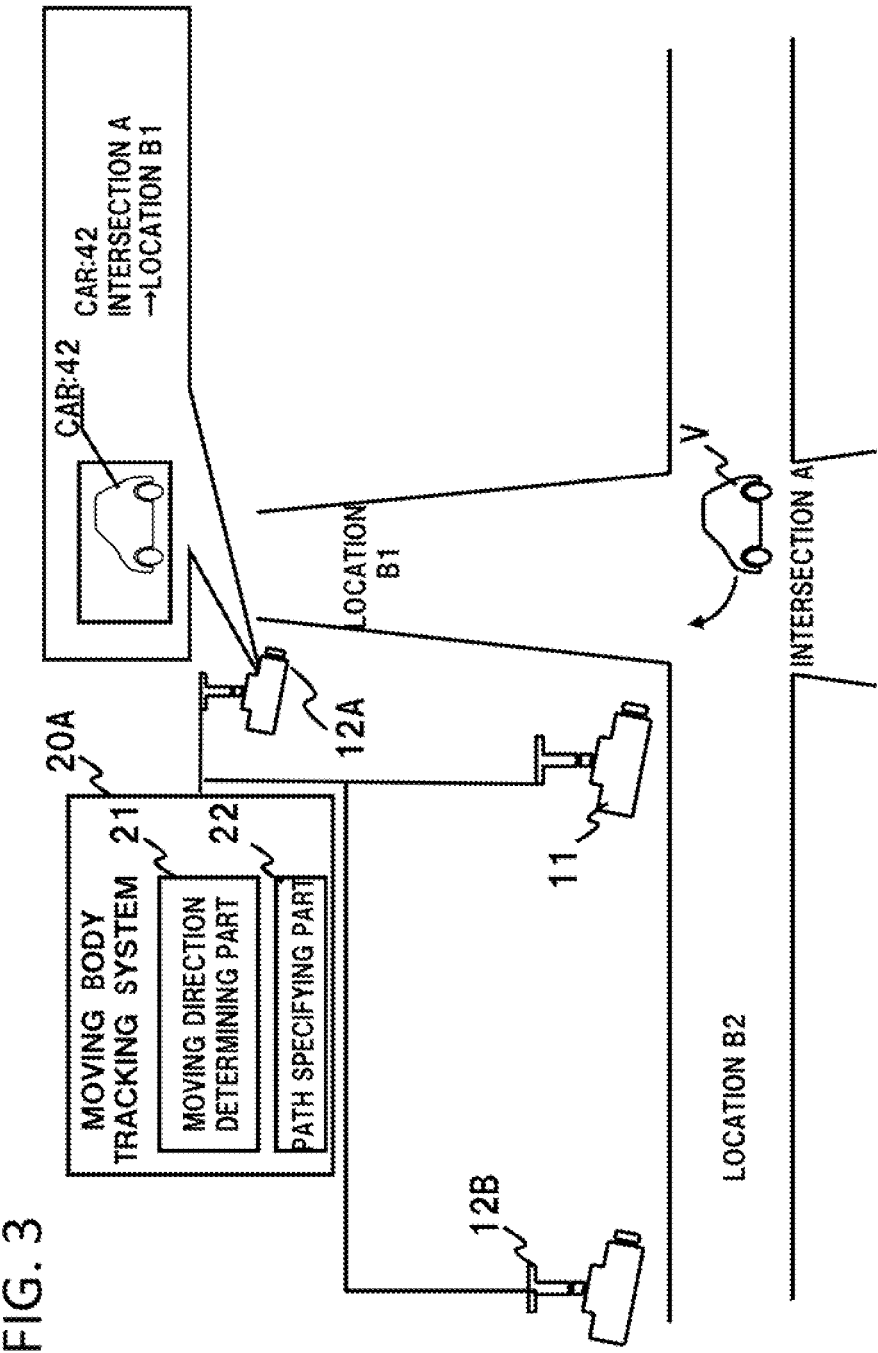
FIG. 3 is a diagram showing a description of an operation of an example embodiment of the present invention.

Then, the path specifying part 22 selects the second camera 12A based on the moving direction of the moving body, and identifies the moving path of the moving body by searching (in) the frame in which the identified moving body has been captured from the captured data of the second camera 12A. For example, as shown in FIG. 3, when the path specifying part 22 confirms the movement of a vehicle whose identification information (CAR) is 42 from the captured data of the second camera 12A, it determines that the vehicle has moved from the intersection A to a Location B1 where the second camera 12A is installed. By repeating the same kind of processing, it is possible to track a moving body that moves through multiple sections.

In this way, the moving body tracking system 20A identifies the path of a moving body such as a vehicle that has entered an intersection. As is clear from the above description, the moving direction determining part 21 determines the moving direction of the moving body, and the path specifying part 22 selects the second camera based on this moving direction. This makes it possible to reduce the number of cameras installed and to track the moving body efficiently, thereby reducing costs and investigation time.

First Example Embodiment

Figure 4:
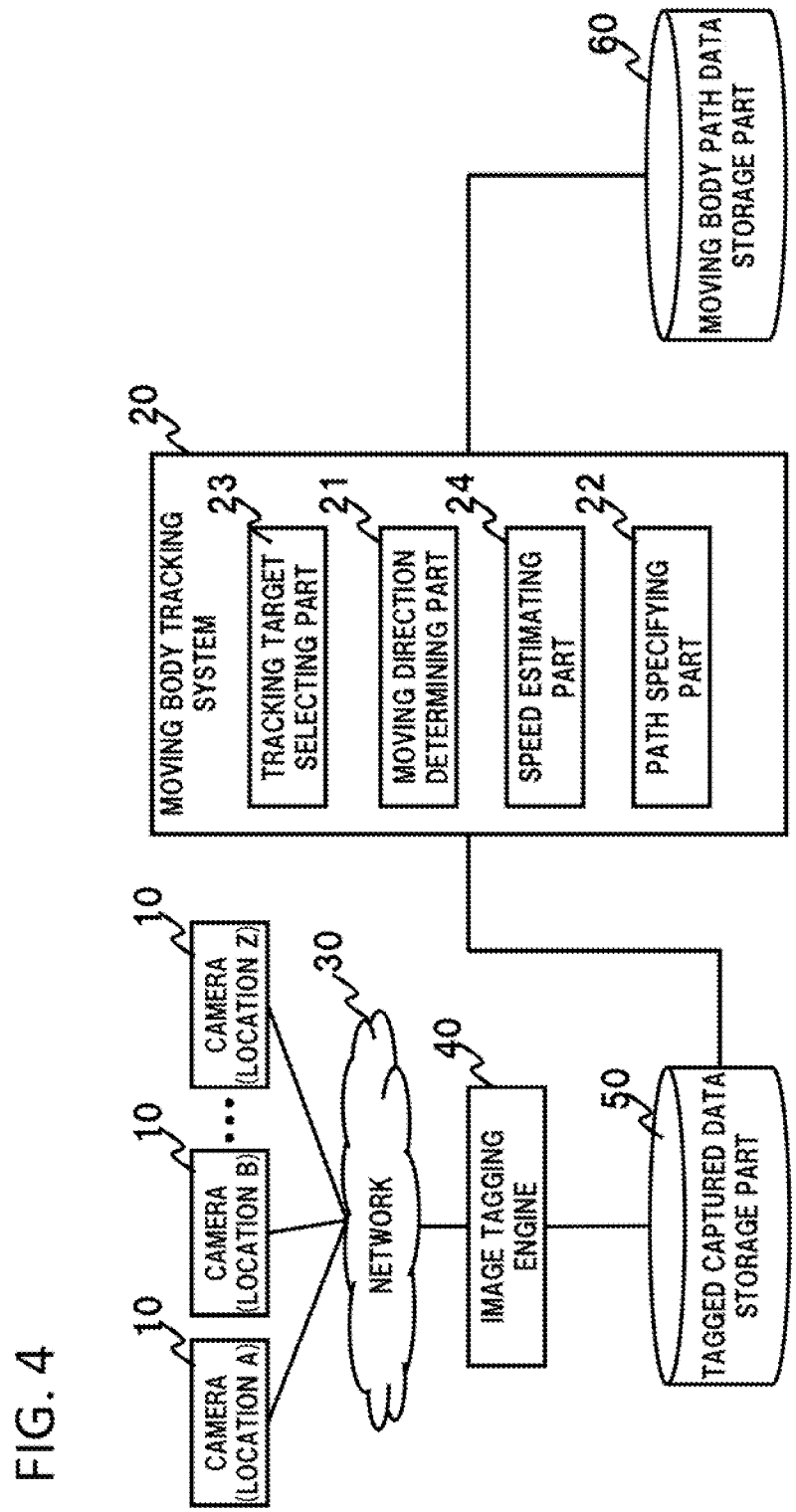
FIG. 4 is a diagram showing a configuration of a moving body tracking system according to a first example embodiment of the present invention.

Then, a first example embodiment of the present invention applied to OD survey will be described in detail with reference to the drawings. FIG. 4 shows a configuration of a moving body tracking system according to the first example embodiment of the present invention. Referring to FIG. 4, a configuration is shown including a plurality of cameras 10, an image tagging engine 40, a tagged captured data storage part 50, a moving body tracking system 20, and a moving body path data storage part 60.

A plurality of cameras 10 are placed, one at respective intersection of the area to be surveyed for OD. Respective camera 10 is located at a position that can capture images of a moving body entering the intersection from the front, rear, left and right directions, and identify the moving direction of the moving body entering the intersection from respective directions. For intersections equipped with traffic lights, the power supplied to the traffic lights can be used as a power source for these cameras 10. Appropriate locations for installation of the cameras 10 are selected depending on the intersection conditions and the focal length of the lens to be mounted. In this example embodiment, these cameras 10 will function as the first and second cameras described above.

It is preferable that the cameras 10 are of a portable type. By doing so, it is possible to bring the cameras 10 to the area where the OD survey is to be conducted, install the cameras 10 at the necessary locations, and conduct the survey, thereby allowing further reduction of the cost of the survey.

An image tagging engine 40 is connected to respective cameras 10 via the network 30, and analyzes the captured data taken by respective camera(s) 10 to recognize and tag the object(s) in the captured data. An in-vehicle recognition device can be used as such an image tagging engine 40. The captured data tagged by the image tagging engine 40 is stored in the tagged captured data storage part 50.

A tagged captured data storage part 50 stores the tag information created by the image tagging engine 40 along with the captured data.

FIG. 5 shows an example of information held in the tagged captured data storage part 50. The example in FIG. 5 shows tag information with the following parameters: object ID, frame number, box coordinate1, box coordinate2, object type, captured time, and camera location information.

Figure 6:
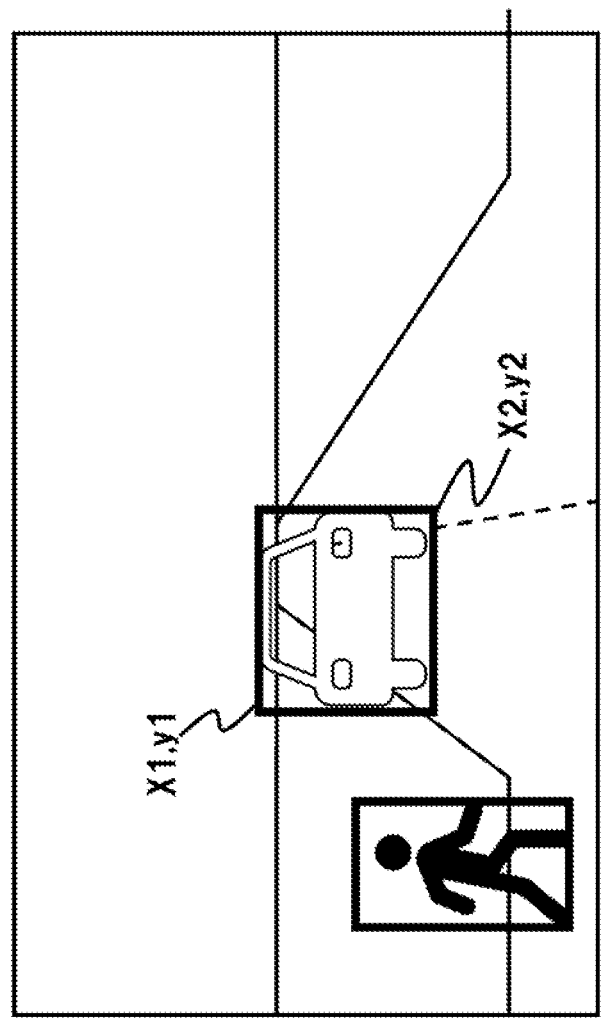
FIG. 6 is a diagram illustrating a function of an image tagging engine.

An example of the operation of the image tagging engine 40 will now be explained. FIG. 6 shows an example of the captured data input to the image tagging engine 40.

Step P1: The image tagging engine 40 extracts object(s) such as vehicle(s), bicycle(s), person(s), etc., from the captured data and adds a rectangular frame (also called as bounding box). The image tagging engine 40 extracts object (s) such as vehicle(s), bicycle(s), person(s), etc., and assigns an ID (object ID) to respective detected object(s). The image tagging engine 40 obtains the captured date and time, frame number, and location information of the camera (camera location information) of the captured data. These can be obtained from the metadata annexed to the captured data.

Step P2: The image tagging engine 40 acquires coordinates of the upper left corner (x1, y1) and lower right corner (x2, y2) of the rectangular frame (bounding box) when the upper left corner of the image is set as the origin (0, 0) for the rectangular frame. These coordinates correspond to the box coordinates 1 and 2 in FIG. 5. Box coordinates 1 and 2 make it possible to grasp (determine) the size of the object and its distance from the camera.

Step P03: The image tagging engine 40 determines whether the object extracted above is a vehicle, a bicycle or a person. The result of this determination becomes the object type information shown in FIG. 5. The object type can be determined using various methods, for example, by calculating the degree of similarity with predetermined standard object image(s), or by using AI (Artificial Intelligence). In this determination process, in case where the accuracy of the object type is obtained, it may be included in the tag information of the accuracy.

In this way, respective information shown in FIG. 5 can be obtained. The above operations of the image tagging engine 40 and the tag information in FIG. 5 are only examples, and various changes can be made. For example, if license plate ("number plate") information of a vehicle is obtained, it is possible to use the license plate number as an object ID of the vehicle.

The moving body tracking system 20 identifies the path of the moving body using the captured data and tag information stored in the above-tagged captured data storage part 50, and stores it in the moving body path data storage part 60.

More concretely, the moving body tracking system 20 has a tracking target selecting part 23, a moving direction determining part 21, a speed estimation part 24, and a path specifying part 22.

When the object ID to be tracked is input, the tracking target selecting part 23 reads the data with the corresponding object ID from the tagged captured data storage part 50 and sends it to the moving direction detecting part 21.

The moving direction detecting part 21 selects the frame with the oldest captured time and the frame with the newest captured time of the tag information exemplified in FIG. 5, and determines the moving direction of the moving body according to a change(s) in box coordinates 1 and 2. For example, if both the X and Y coordinates change significantly, the moving direction determining part 21 determines that the moving body (vehicle) has made a right or left turn at the intersection. On the other hand, if only one of the X and Y coordinates is changing significantly, the moving direction detecting part 21 determines that the moving body (vehicle) is running straight through the intersection. The moving direction detecting part 21 sends the object ID and the result of the determination to the speed estimating part 24.

The speed estimating part 24 selects a frame with an oldest captured time and a frame with a newest captured time of the tag information exemplified in FIG. 5, and calculates a moving distance of the moving body by changing the box coordinates' and 2. Next, the speed estimating part 24 calculates the speed of the moving body by dividing the calculated distance traveled by the difference in the captured times. The speed estimating part 24 sends the object ID and its estimated speed as a result of the determination to the path specifying part 22.

The path specifying part 22 calculates an intersection that the moving body is assumed to pass through next and its estimated arrival time based on the moving direction and estimated speed obtained by the moving direction detecting part 21 and speed estimating part 24, and the connection relationship between intersections. Then, the path specifying part 22 reads out the captured data of the estimated arrival time from the captured data taken by the camera 10 that is captured the corresponding intersection. If any object similar to an object identified by the object ID is captured in the read data, the path specifying part 22 determines that it is the same moving body and records it as the moving path of the corresponding object ID.

Repeating the above operation, the moving body tracking system 20 creates the path information of the moving body and stores it in the moving body path data storage part 60.

FIG. 7 shows an example of the path information held in the moving body path data storage part 60. The example in FIG. 7 shows the path information of a moving body, which is configured by sequential recording of its passing location for respective object ID and its captured time.

Figure 8:
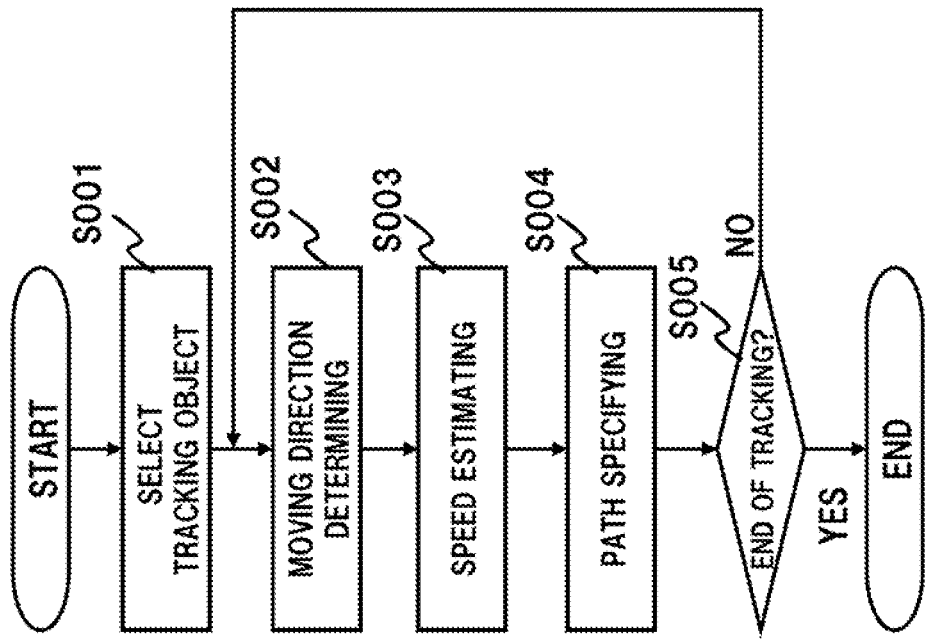
FIG. 8 is a flowchart showing an operation of moving body tracking system of an example embodiment of the present invention.

Next, the operation of this example embodiment will be described in detail with reference to the drawings. FIG. 8 is a flowchart representing the operation of the moving body tracking system according to the first example embodiment of the present invention. Referring to FIG. 8, first, the moving body tracking system 20 selects a moving body to be tracked, starting from an arbitrary point (step S001). This selection of the moving body to be tracked may be instructed by the user, or it may be an object ID selected by the moving body tracking system 20. For example, a scheme in which the moving body tracking system 20 tracks all of the object IDs detected at any given location by referring to the tagged captured data storage 50 can also be adopted.

Next, the moving body tracking system 20 determines the moving direction of the moving body having the selected object ID (Step S002).

Next, the moving body tracking system 20 estimates a speed of the moving body having the selected object ID (Step S003).

Next, the moving body tracking system 20 identifies a path by referring to the data of the captured time obtained from the estimated speed in the captured data of the intersection to which the moving body having the selected object ID is moving (Step S004).

And next, the moving body tracking system 20 determines whether or not the tracking of the moving body having the selected object ID should be terminated (Step S005). The conditions for terminating the tracking of the moving body may be as follows. The first condition is when the moving body being tracked reaches an intersection at the end of the area in which the OD survey is conducted. In this case, the tracking can be terminated because the identification of the starting point, the ending point, and the path between them has been completed. The second condition is when loss of sight of the moving body under tracking has occurred. In this case, the reason may be that the moving body has stopped moving from the last intersection, for example, because it has reached its destination. In this case, too, the identification of the starting point, the end point, and the path between them has been completed, so the tracking can be terminated. Another reason for losing sight of the moving body under tracking is that the moving body made a U-turn in the middle of the road, and the tracking has failed. In this case, the survey may be terminated, or the search may be continued by expanding the search target.

If, as a result of the above determination, it is determined that tracking is to be continued (NO in step S005), the moving body tracking system 20 reads the captured data of the intersection which the corresponding moving body last entered and continues the processing of steps S002 to S004.

On the other hand, if it is determined that the tracking is to be terminated (YES in step S005), the moving body tracking system 20 records the path information exemplified in FIG. 7 in the moving body path data storage part 60, and ends the processing.

Figure 9:
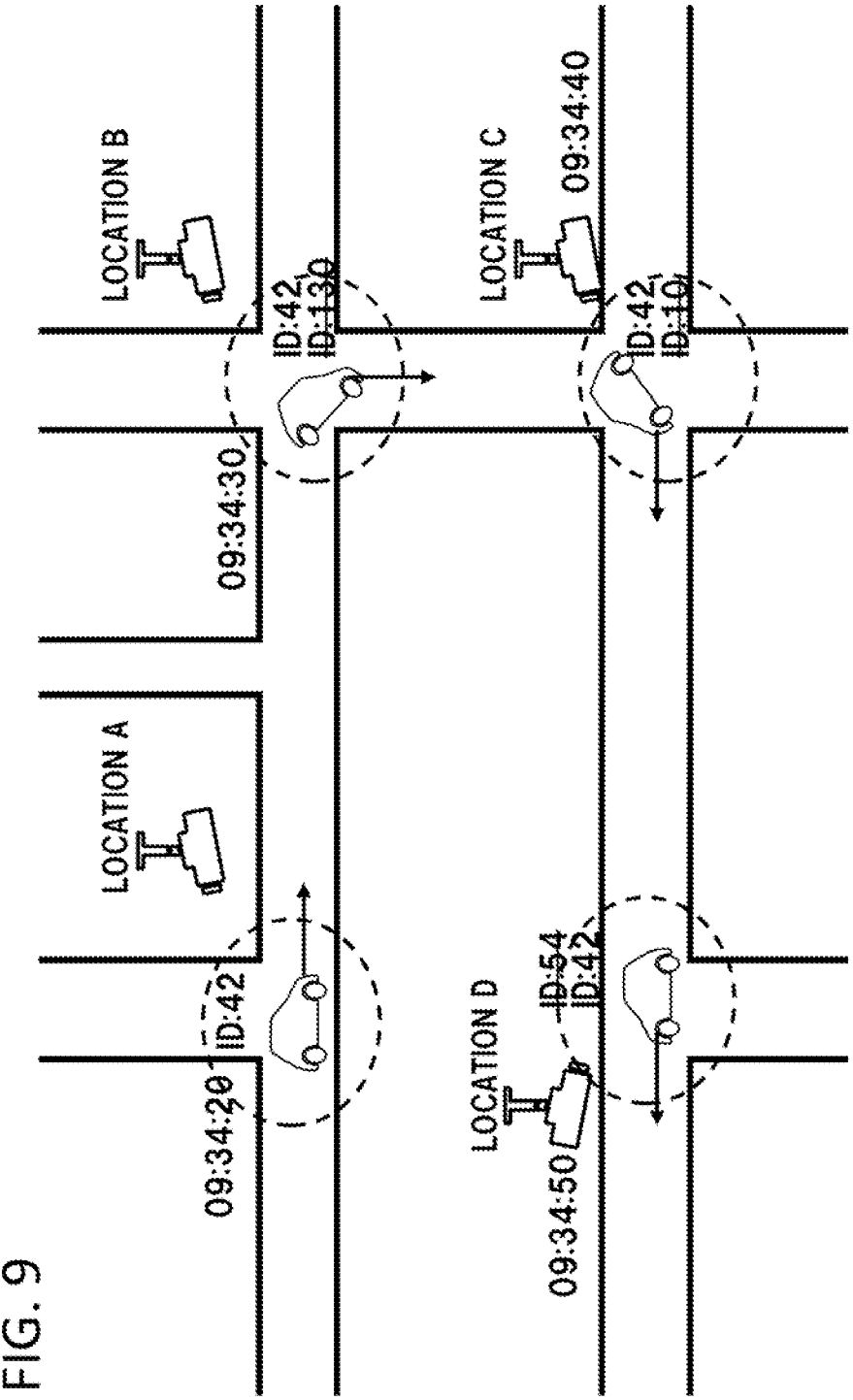
FIG. 9 is a diagram showing a description the tracking operation of the moving body by the moving body tracking system of a first example embodiment of the present invention.

With reference to FIG. 9, the operation of the moving body tracking system 20 of this example embodiment will be described in detail. In the following explanation, it will be assumed that an OD survey of a moving body originating from Location A is performed. For example, let us assume that a vehicle with object ID=42 passed Location A at 9:34:20 (hour:minute:second). In this case, the moving body tracking system 20 estimates that the vehicle with object ID=42 is destined to Location B based on the captured data at Location A, and that an estimated time of arrival is 9:34:30.

Next, based on the moving direction determined at Location A and the estimated time of arrival, the moving body tracking system 20 identifies a vehicle that passed Location B at around 9:34:30 among the captured data at Location B. In the example in FIG. 9, the vehicle with object ID=42 and a vehicle ID with object ID=130 are shown (captured), but the moving body tracking system 20 selects the vehicle with object ID=42, which has a more similar appearance. Then, the tracking system 20 selects the vehicle with the object ID=42 based on the captured data at Location B.

In the similar way, the moving body tracking system 20 identifies the vehicle that passed Location C at around 9:34:40 among the captured data at Location C based on the moving direction determined at Location B and the estimated time of arrival. In the example in FIG. 9, the vehicle with object ID=42 and a vehicle with object ID=10 are shown, but the moving body tracking system 20 selects the vehicle with object ID=42, which has a more similar appearance. In the same way below, the moving body tracking system 20 confirms that the vehicle with object ID=42 has reached Location D, at which it ends the tracking.

As explained above, according to this example embodiment, it is possible to track a moving body by installing one or more cameras per intersection. The reason for this is that the moving body tracking system 20 has adopted a configuration to determine the moving direction and thereby track the moving body. This system also makes it possible to reduce the investigation time. The reason for this resides in that the moving body tracking system 20 estimates the speed of the moving body and uses the estimated arrival time of the moving body to efficiently conduct tracking. Note, the moving bodies do not necessarily pass only the intersections at which the cameras are installed, and it is possible that a certain number of moving bodies may be lost from tracking, as described in step S005 above. However, the collection rate of questionnaires in the current OD survey is about 30 to 60% (conducted by the MLIT in fiscal year 2015), and the survey data can be sufficiently obtained with this method, too.

Second Example Embodiment

Figure 10:
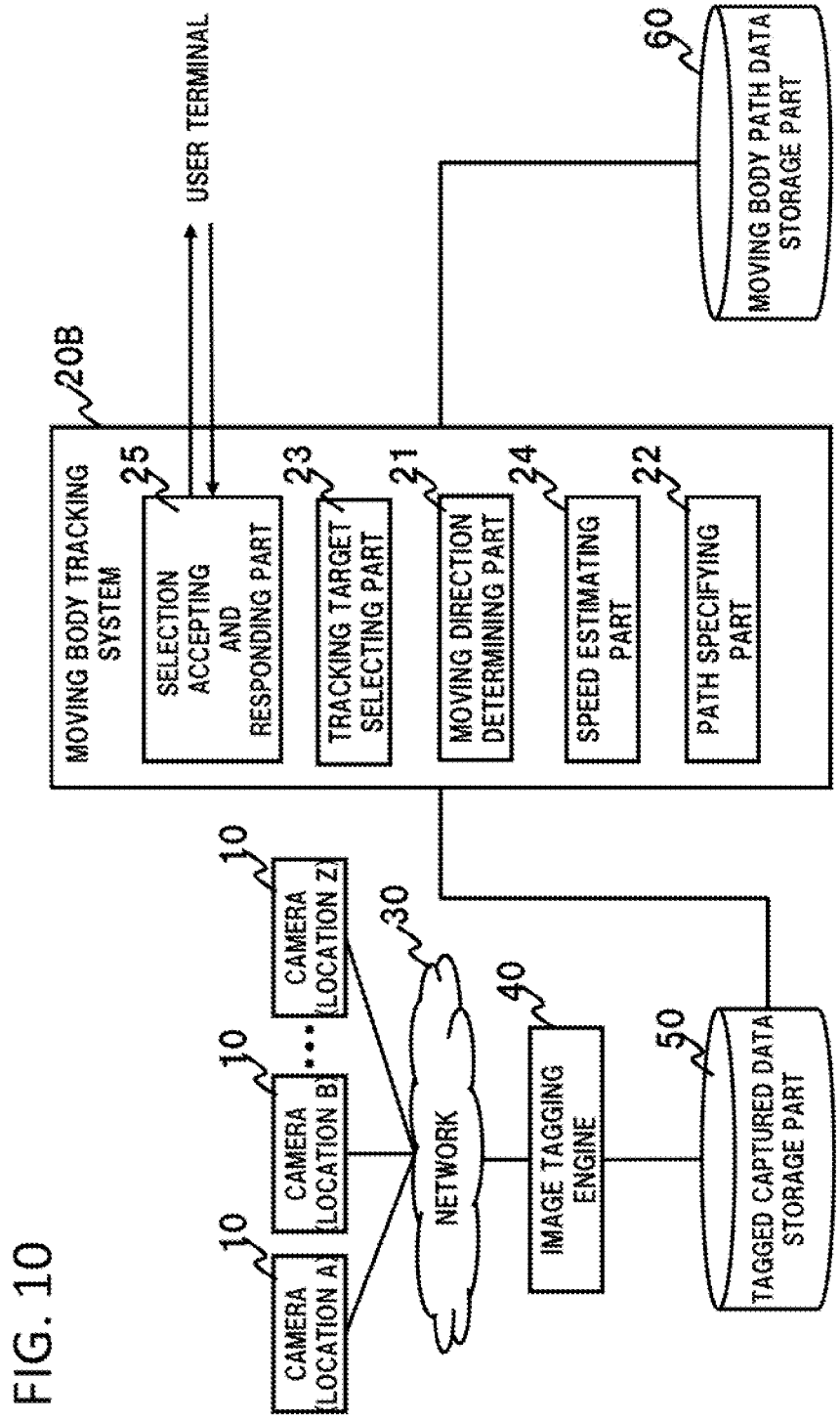
FIG. 10 is a diagram showing a configuration of a moving body tracking system according to a second example embodiment of the present invention.

Next, a second example embodiment, which uses the configuration of the first example embodiment above and adds a function of displaying map information representing a path of a particular moving body, will be described in detail with reference to the figures. FIG. 10 shows a configuration of the second example embodiment of the moving body tracking system. Referring to FIG. 10, a configuration in which a selection accepting and responding part 25 is added to the moving body tracking system 20B is shown.

The selection accepting and responding part 25 comprises a function to display map information on a predetermined map that displays a movement path of a moving body accepted from a predetermined user terminal. Concretely, when the selection accepting and responding part 25 receives a selection of a moving body from a predetermined user terminal, it takes out (retrieves) path information of the corresponding object ID from the moving body path data storage part 60. Then, the selection accepting and responding part 25 responds, to the user terminal, map information displaying a movement path of the moving body whose selection was accepted on a predetermined map.

Figure 11:
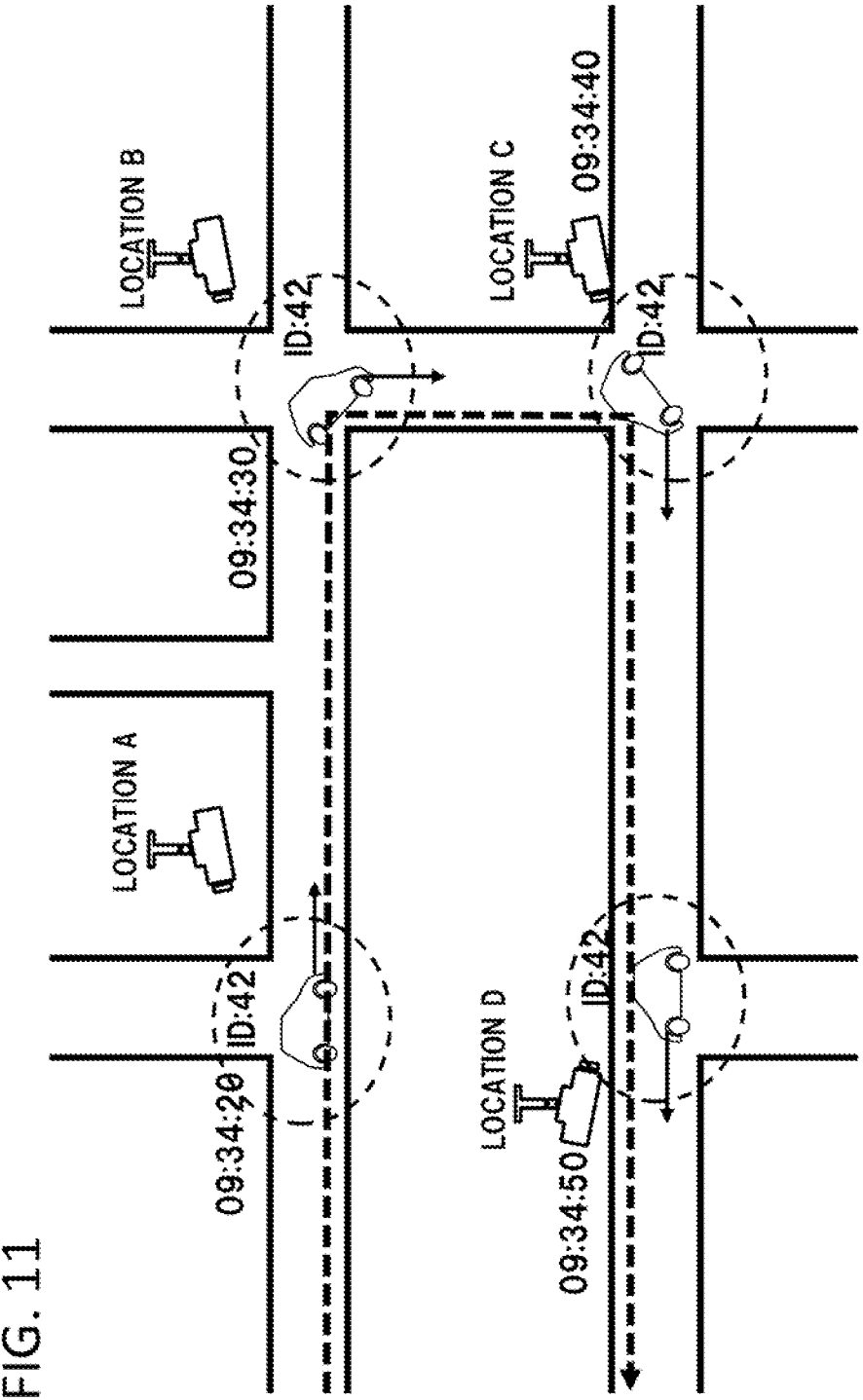
FIG. 11 is a diagram showing an example of a path display by the second example embodiment of the present invention.

FIG. 11 shows an example of a path display mode of a moving body tracking system by the second example embodiment of the present invention. For example, it is assumed that the selection accepting and responding part 25 accepts a designation of the vehicle with object ID=42 from a predetermined user terminal.

In this case, the moving body tracking system retrieves the path information of an object with object ID=42 from the moving body path data storage 60. The user terminal displays map information showing the moving path of the object with object ID=42 on a predetermined map, as shown in FIG. 11.

The user of the user terminal can check a movement history of suspicious vehicle(s) by referring to such map information. Of course, it is also possible to specify a moving body other than a vehicle as an object ID and check (monitor) its movement history. For example, it is possible to track a bicycle(s) used by a criminal person to escape, which can be useful for criminal investigations.

As described above, this invention can be used not only as an OD survey but also as a tracking system (displaying movement history) specifying any vehicle.

Although the respective example embodiments of the present invention have been described above, the present invention is not limited to the above-described example embodiments, and further modifications, replacements, and adjustments can be made without departing from the basic technical concept of the present invention. For example, the network configuration, the configuration of respective elements, and the expression form of the message(s) shown in respective drawings are examples for helping understanding of the present invention, and are not limited to the configurations shown in these drawings.

Figure 12:
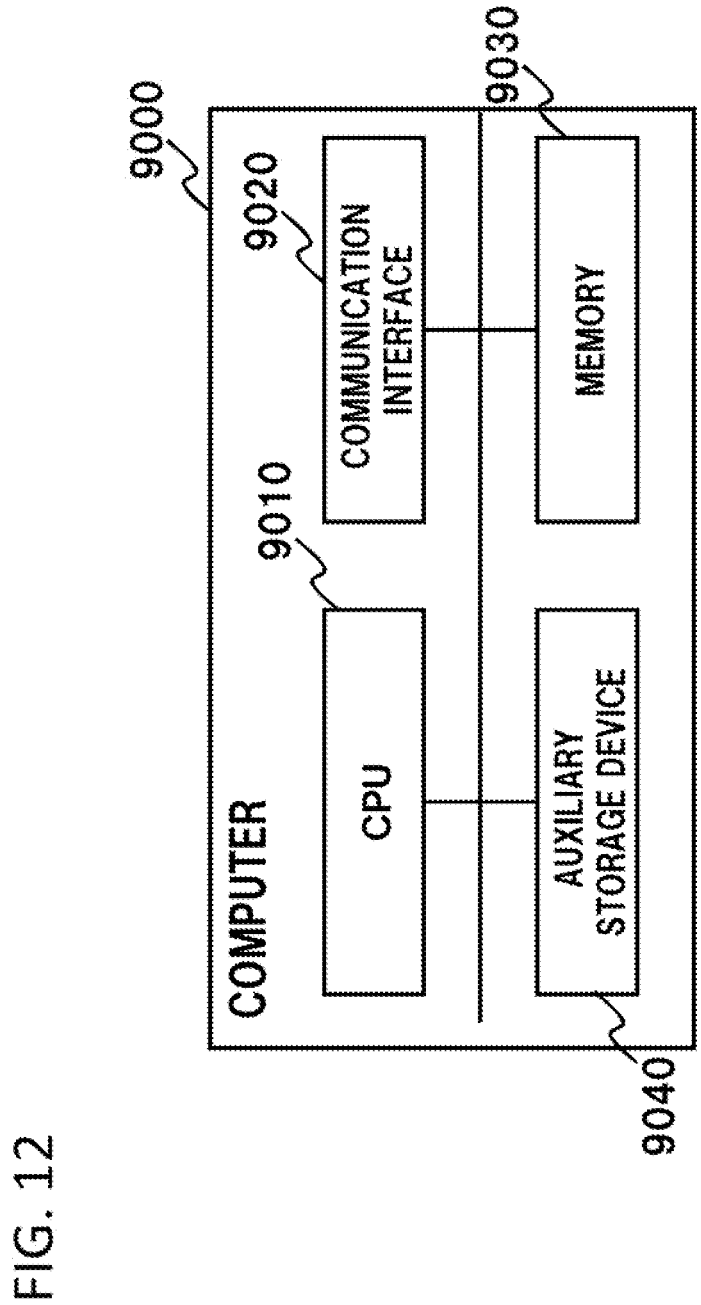
FIG. 12 is a diagram showing a configuration of a computer formulating a moving body tracking system according to the present invention.

In addition, the procedure(s) shown in the above-described first to second example embodiments can be realized (implemented) as a program for causing a computer (9000 in FIG. 16) that functions as the moving body tracking system 20/20A/20B to execute processing as the moving body tracking system. For example, this kind of computer has a configuration comprising Central Processing Unit (CPU) 9010, Communication Interface 9020, Memory 9030, and Auxiliary Storage Device 9040 as described in FIG. 12. That is, the CPU 9010 of FIG. 12 executes the moving direction determining program/speed estimating program, the data conversion program and refers to the calculating parameters held in the auxiliary storage device 9040 to execute the processing.

That is, every part (processing means, function) of moving body tracking system described in first and second example embodiments can be realized by a computer program that causes the processor in these systems to execute above processing using its hardwares respectively.

Lastly, preferred modes of the present invention are outlined herein below.

[Mode 1]
(Refer to above mentioned moving body tracking system of the first aspect of the present invention.)

[Mode 2]
The moving body tracking system, further comprising a speed estimating part that estimates a speed of the moving body based on a location of the moving body recorded in the captured data by the first camera, wherein the path specifying part selects the captured data by the second camera based on the speed of the moving body.

[Mode 3]
The moving body tracking system, wherein the cameras are installed in an intersection of an area in which an Origin-Destination (OD) survey is conducted, and the system comprises a function that performs the OD survey by causing the cameras to function as the first and/or second camera(s).

[Mode 4]
The moving body tracking system, wherein the first camera is installed at a location that allows to capture the moving body entering the intersection, from the front, back, left and right directions, and identify the moving direction of the moving body entering the intersection, from respective direction.

[Mode 5]
The moving body tracking system, further comprising: a path storage part that stores path information indicating a path for respective identified moving body, and a map information displaying part that displays map information displaying a path of the moving body accepted from a predetermined user terminal on a predetermined map.

[Mode 6]
(Refer to above mentioned moving body tracking method of the second aspect of the present invention.)

[Mode 7]
(Refer to above mentioned program of the third aspect of the present invention.)

Mode 6 and Mode 7 can be expanded to Modes 2 to 5 likewise as the Mode 1.

It is to be noted that each of the disclosures in the abovementioned patent literatures is incorporated herein by reference. Modifications and adjustments of example embodiments and examples are possible within the bounds of the entire disclosure (including the claims) of the present invention, and also based on fundamental technological concept(s) thereof. Furthermore, a wide variety of combinations and selections (including partial deletions) of various disclosed elements is possible within the scope of the claims of the present invention. That is, the present invention clearly includes every type of transformation and modification that a person skilled in the art can realize according to the entire disclosure including the claims and to technological concept(s) thereof. In particular, with respect to the numerical ranges described in the present application, any numerical values or small ranges included in the ranges should be interpreted as being specifically described even if not otherwise explicitly recited.

SIGNS LIST

10 Camera
11 First camera
12A, 12B Second cameras
20, 20A, 20B Moving body tracking system
21 Moving direction determining part
22 Path specifying part
23 Tracking target selecting part
24 Speed estimating part
25 Selection accepting and responding part
30 Network 40 Image tagging engine
50 Tagged captured data storage part
60 Moving body path data storage part
9000 Computer
9010 CPU
9020 Communication Interface
9030 Memory
9040 Auxiliary Storage Device
V Vehicle

What is claimed is:

1. A moving body tracking system, comprising:
a first camera that captures one or more images of a moving body entering a first intersection,
a plurality of second cameras installed in a plurality of locations set as destinations of the moving body entering the first intersection,
a memory configured to store a program, and
a processor configured to execute the program, that when executed performs operations comprising:
determining a moving direction of the moving body entering the first intersection due to a change in direction of the moving body based on data captured by the first camera;
selecting a second camera from the plurality of second cameras based on the moving direction of the moving body;
searching a frame of one or more images captured by the selected second camera for the moving body;
specifying a moving path of the moving body;
estimating an estimated arrival time of the moving body to a point where the selected second camera is installed;
determining whether or not loss of sight of the moving body under tracking has occurred based on whether the moving path of the moving body can be specified at the point where the selected second camera is installed at the estimated arrival time;
end the tracking of the moving body, in a case that loss of sight of the moving body under tracking has occurred;
storing path information indicating a path for respective identified moving body; and
displaying map information depicting the path of the moving body accepted from a predetermined user terminal on a predetermined map.

2. The moving body tracking system according to claim 1, wherein the operations performed by the processor further comprise:
estimating a speed of the moving body based on a location of the moving body recorded in the data captured by the first camera, and
selecting the one or more images captured by the second camera based on the speed of the moving body.

3. The moving body tracking system according to claim 1, wherein a plurality of cameras are installed in a plurality of locations of an area in which an Origin-Destination (OD) survey is conducted, wherein the operations performed by the processor further comprise performing the OD survey by causing the plurality of cameras to function as at least one of the first camera and a second camera.

4. The moving body tracking system according to claim 1, wherein the first camera is installed at a position that allows to capture the moving body entering the first intersection, from the front, back, left and right directions, and identify the moving direction of the moving body entering the first intersection from the respective direction.

5. A moving body tracking method performed by a computer formulating a moving body tracking system, comprising:
determining a moving direction of a moving body entering a first intersection based on a captured data by a first camera capturing the moving body entering the first intersection;
selecting a second camera from a plurality of second cameras installed in a plurality of locations determined as destinations of the moving body entering the first intersection based on the moving direction of the moving body,
specifying a moving path of the moving body by searching one or more frame in which the moving body is captured from the captured data of the selected second camera;
calculating an estimated arrival time of the moving body to a point where the selected second camera is installed by the computer;
determining whether or not loss of sight of the moving body under tracking has occurred based on whether the moving path of the moving body can be specified at the point where the selected second camera is installed at the estimated arrival time by the computer;
ending the tracking of the moving body by the computer, in a case that loss of sight of the moving body under tracking has occurred;
storing path information indicating a path for respective identified moving body; and
displaying map information depicting the path of the moving body accepted from a predetermined user terminal on a predetermined map.

6. The moving body tracking method according to claim 5, further comprising:
estimating a speed of the moving body based on a location of the moving body recorded in the captured data by the first camera, and
selecting the captured data by the second camera based on the speed of the moving body.

7. The moving body tracking method according to claim 5, wherein a plurality of cameras are installed in a plurality of locations of an area in which an Origin-Destination (OD) survey is conducted, and the method further comprises performing the OD survey by causing the plurality of cameras to function as at least one of the first camera and a second camera.

8. The moving body tracking method according to claim 5, wherein the first camera is installed at a position that allows the first camera to capture the moving body entering the first intersection; from the front, back, left and right directions, and further comprising identifying the moving direction of the moving body entering the first intersection; from the respective direction.

9. A computer-readable, non-transient recording medium storing a program for causing a computer that is capable of accessing captured data captured respectively, by
a first camera that captures one or more image(s) of a moving body entering a first intersection, and
a plurality of second cameras installed in a plurality of locations determined as destinations of the moving body entering the first intersection,
wherein the program causes the computer to perform an operation, the operation comprising:
a process that determines a path direction of the moving body entering the first intersection based on the captured data by the first camera;

a process that selects a second camera from the plurality of second cameras based on the path direction of the moving body, and specifies a path of the moving body by searching one or more frame in which the moving body is captured from the captured data of the selected second camera, a process that calculates an estimated arrival time of the moving body to a point where the selected second camera is installed;

a process that determines whether or not loss of sight of the moving body under tracking has occurred based on whether the moving path of the moving body can be specified at the point where the selected second camera is installed at the estimated arrival time;

a process that ends the tracking of the moving body, in a case that loss of sight of the moving body under tracking has occurred;

storing path information indicating a path for respective identified moving body; and displaying map information depicting the path of the moving body accepted from a predetermined user terminal on a predetermined map.

10. The medium according to claim 9, wherein the program causes the computer to perform the operation, the operation further comprising:

estimating a speed of the moving body based on a location of the moving body recorded in the captured data by the first camera, and selecting the captured data by the second camera based on the speed of the moving body.

11. The medium according to claim 9, wherein a plurality of cameras are installed in a plurality of locations of an area in which an Origin-Destination (OD) survey is conducted, and the program causes the computer to perform the operation, the operation further comprising performing the OD survey by causing the plurality of cameras to function as at least one of the first camera and a second camera(s).

12. The medium according to claim 9, wherein the first camera is installed at a position that allows to capture the moving body entering the first intersection, from the front, back, left and right directions, and the program causes the computer to perform the operation, the operation further comprising identifying the moving direction of the moving body entering the first intersection; from the respective direction.

* * * * *